US007296040B2

United States Patent
Cazemier et al.

(10) Patent No.: US 7,296,040 B2
(45) Date of Patent: Nov. 13, 2007

(54) SYSTEM AND METHOD OF FORMULATING QUERIES IN RELATIONAL DATABASES

(75) Inventors: Henk Cazemier, Spencerville (CA); Xiaowen He, Nepean (CA)

(73) Assignee: Cognos, Incorporated, Ottawa, Ontario (CA)

( * ) Notice: Subject to any disclaimer, the term of this patent is extended or adjusted under 35 U.S.C. 154(b) by 531 days.

(21) Appl. No.: 10/835,522

(22) Filed: Apr. 29, 2004

(65) Prior Publication Data

US 2005/0015367 A1    Jan. 20, 2005

(30) Foreign Application Priority Data

Apr. 29, 2003   (CA)   .................................... 2427226

(51) Int. Cl.
*G06F 12/00* (2006.01)
(52) U.S. Cl. .......................................... 707/204; 707/5
(58) Field of Classification Search ................ 707/100, 707/102, 104.1, 105, 1–10, 101, 203, 204
See application file for complete search history.

(56) References Cited

U.S. PATENT DOCUMENTS

| | | | |
|---|---|---|---|
| 4,454,576 A | | 6/1984 | McInroy et al. |
| 5,903,859 A | | 5/1999 | Stone et al. |
| 6,003,036 A | * | 12/1999 | Martin ........................ 707/102 |
| 6,411,961 B1 | | 6/2002 | Chen |
| 6,581,068 B1 | * | 6/2003 | Bensoussan et al. ...... 707/104.1 |
| 6,658,627 B1 | | 12/2003 | Gallup et al. |
| 6,738,762 B1 | * | 5/2004 | Chen et al. ..................... 707/3 |
| 6,847,962 B1 | * | 1/2005 | Cochrane et al. ............... 707/4 |
| 6,996,566 B1 | | 2/2006 | George et al. |
| 6,999,977 B1 | * | 2/2006 | Norcott et al. .............. 707/203 |
| 2003/0088558 A1 | * | 5/2003 | Zaharioudakis et al. ....... 707/3 |
| 2003/0154277 A1 | | 8/2003 | Haddad et al. |
| 2004/0039729 A1 | | 2/2004 | Boger et al. |
| 2004/0249810 A1 | * | 12/2004 | Das et al. ....................... 707/5 |
| 2004/0268306 A1 | | 12/2004 | Cheng et al. |

FOREIGN PATENT DOCUMENTS

EP   0 413 486   2/1991

\* cited by examiner

*Primary Examiner*—Wilson Lee
(74) *Attorney, Agent, or Firm*—Shumaker & Sieffert, P.A.

(57) ABSTRACT

The invention introduces a method and system to automatically derive the relationships between query subjects and query items within query subjects so that problems such as those that result in double courting of information are avoided. It provides for creating a report by first defining a model based on an existing database comprising two or more query subjects, each query subject comprising at least one fact query item and one primary key, then generating a hierarchy of sets and subsets of key query items within the model. Next a further fact is introduced into one of the query subjects. The expression is decomposed into sub-queries to prevent double counting of data in ambiguously defined situations. This is achieved using the introduced fact to determine that such decomposition is required. Finally, the data is accessed using the sub-queries, and a report is produced.

3 Claims, 3 Drawing Sheets

SYSTEM AND METHOD OF FORMULATING QUERIES IN RELATIONAL DATABASES

FIELD OF THE INVENTION

The present invention concerns database analysis and more particularly methods for improving query formulation based on model and metadata information describing data stored in relational database systems.

BACKGROUND OF THE INVENTION

Large data sets are now commonly used in business organizations. In fact, so much data has been gathered that responding to even a simple question about the data has become a challenge. The modern information revolution is creating huge data stores that, instead of offering increased productivity and new opportunities, are threatening to drown the users in a flood of information. Tapping into large databases for even simple browsing can result in an explosion of irrelevant and unimportant facts. Even people who do not 'own' large databases face the overload problem when accessing databases on the Internet. A large challenge now facing the database community is how to sift through these databases to find useful information.

Existing database management systems (DBMS) perform the steps of reliably storing data and retrieving the data using a data access language, such as Structured Query Language (SQL). One major use of database technology is to help individuals and organizations make decisions and generate reports based on the data contained in the database.

In these databases it is usual to relate data in various tables using joins that allow the data to be accessed in different ways. The manner of performing such joins is well understood, but in the increasingly complex data being analyzed, there are several opportunities for information to be misinterpreted. For example, one such mechanism results in the double counting of data. In these more complex data environments, it is well known to use modeling software applications to provide a convenient mechanism to relate the data in ways that male most sense to the users. Such modeling applications are intended to minimize the knowledge required of a user to make appropriate queries of the data. However, in some cases, the very nature and complexity of the data and its structure has meant that the user is required to have considerable knowledge of the actual structure of the data. What is needed is away to reduce this requirement.

SUMMARY OF THE INVENTION

The invention provides a methodology to automatically derive the relationships between tables and columns within tables so that problems such as those that result in double counting of information are avoided. The invention also provides for a process that is largely automated and therefore less error-prone.

In one aspect the invention comprises a method for creating a report in a computer-based business intelligence system, the method comprising the steps of defining a model based on an existing database including at least two query subjects, each query subject comprising at least one fact query item and one primary key query item, generating a hierarchy of query items in query subjects within the model, introducing a further fact into one of the query subjects, accepting an input request from a user to define the contents of the report, determining an expression to extract data from the database to fulfill the input request, decomposing the expression into subqueries to prevent multiple-counting of data in ambiguously defined by using the further fact to determine that such decomposition is required, accessing the data using the subqueries and producing the report.

BRIEF DESCRIPTION OF DRAWINGS

The invention will be explained with reference to the following drawings.

DETAILED DESCRIPTION OF EMBODIMENTS OF THE INVENTION

Figure 1:
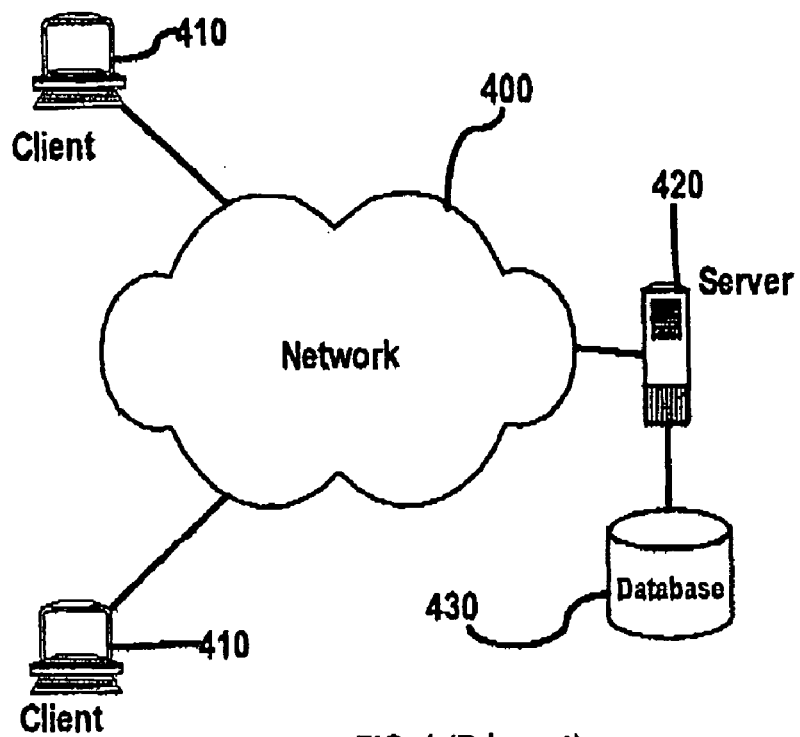
FIG. 1 shows a typical configuration in which embodiments of the invention may be deployed.

Embodiments of the invention are used in a general purpose client-server database system framework suitable for a business intelligence system. FIG. 1 shows a typical configuration in which such embodiments may be conveniently deployed. This configuration includes a network 400 that permits clients 410 to communicate with a server 420 having a database or data warehouse 430 attached. Other configurations would be suitable including those where the client and server functions are not separate, and those where more than one database is used, and those in which the databases are remote from the server and accessed over a network.

In the following description a number of terms are introduced. The first of these is a "query subject", which is used to model a table in a relational data source. The second is a "query item", which represents a column of a table in the relational data source.

Modelers are experts in defining transforms between databases and the derived data stored in data warehouses. They also provide the necessary tools to permit users and report authors to access the resultant data. The modeler is expected to properly define the functional dependency between query items in a query subject (referred to as capturing the determinants of a query subject). Within a query subject, a determinant is a set of query items whose values describe, identify, limit, or otherwise determine the values of one or more other query items within the query subject. Each query subject has at least one determinant, namely, the one or more query items that make up the primary key. Previous solutions to the problem have usually involved the modeler manually defining levels, thereby organizing them into hierarchies. In these hierarchies, each level contains one or more "key query items", and one or more properties. However, performing this task can be tedious and error-prone. It is therefore one objective of this invention to reduce the level of effort required by the modeler so that the definition of the hierarchy is dealt with invisibly, and does not impact the modeler at all.

In systems employing embodiments of the invention. The modeler produces a model that can be adapted and run by a report author. The resultant model content is accessed by a query engine in which information obtained by parsing the query and by examining the model is used to produce valid SQL (or an equivalent data manipulation language), based on a specified query. This resultant SQL code is ultimately used to produce a report, that report being data extracted from the database and formatted as required by the end-user.

Dimension information is dynamically generated based on the joins (also referred to as associations or relationships) between the query subject (which are somewhat analogous to a table) under examination and other related query subjects. In addition, information stored in unique indices is used to determine if some combination of query items uniquely identifies a row in the query subject. In addition, information about unique indices is used to detect the presence of determinants.

It should be noted that the "introduction" of an extra query subject as described in the various embodiments of the invention does not necessarily mean that new data are added to the database, (or even to the derived database where one is used). In many cases, the data will already exist, with the required relationship. As used here "introduction" should therefore be taken to mean that embodiments of the invention "sake advantage" of these data and their relationship to data of interest—previously ignored—in determining the relationship interdependence of the data. (This might be considered as deriving the metadata—that which describes the data—from context.)

The following rules are used in the computation of the dimensional information:
1. for a given query subject (QS1) compute a unique set of determinants {D}The set of query items of The Primary Key and each set of query items of each of the unique Indices define a determinant.
2. a determinant is related to a set of query items {QI}
3. a subset of {QI} called {QI}_s may be used in the relationship with another query subject (QS2), since it is a subset it is known that the data from QS2 potentially relates to multiple rows of QS1, thus The potential for multiple counting is detected.
4. a further subset of {QI}_s called {QI}_ss may be related to yet another query subject (QS3)
5. The number of rows related to these query item sets is {QI}>{QI}_s>{QI}_ss
6. Each set of query items forms a level.
7. A set of levels is organized in a hierarchy. The highest level has the fewest query items and each lower level has more query items, each higher level having a set of query items that is a subset of its immediate lower level.
8. Multiple hierarchies for a query subject are computed for non-overlapping determinants.

As an illustration of the rules, given:
QSI with
Determinants
D1 as {QI_A, QI_B, QI_C}
D2 as {QI_D}
Relationship
R1 using QI_D
R2 using QI_A, QI_B, QI_C
R3 using QI_A, QI_B
Based on R1 a hierarchy with a single level is computed
H1
-->L1:{QI_D}
Based on R2 and R3 a hierarchy with two levels is computed
H2
-->L2: {QI_A, QI_B}
-->L3: {QI_A, QI_B, QI_C}

The invention and its utility are most conveniently described with reference to simple examples in which a user wishes to produce reports containing measures totaled by various periods—monthly, quarterly, annually. First, the situation is described in which miscounting occurs. NM manual changes that would eliminate the problem are described. Finally, the necessary changes to implement an embodiment of the invention are described, giving the sample code snippets that result from the query engine once the embodiments are utilized.

The code snippets that follow are of modeling 'code' or pseudocode. Comments within the code are shown by: /* <cogment text> */.

Figure 2:
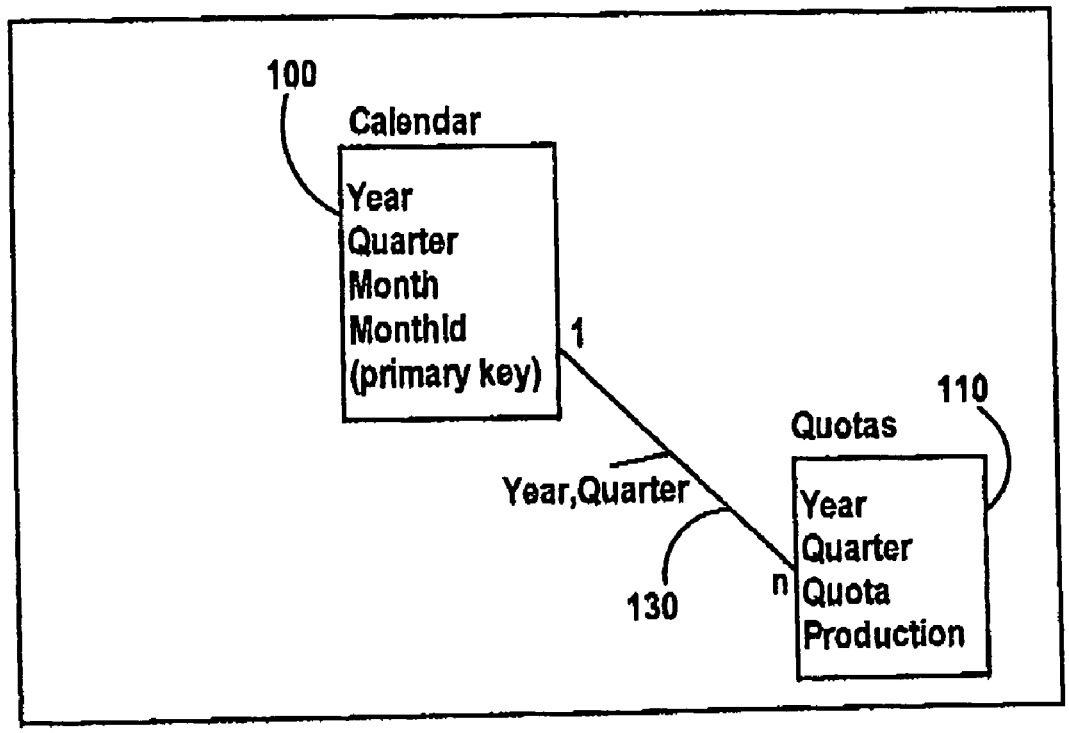
FIG. 2 illustrates a situation where embodiments of the invention can be used.

The first example describes the data as shown in FIG. 2 assuming that the embodiment of the invention is not applied. FIG. 2 is a simple entity relationship (ER) diagram, showing two fact tables, or query subjects, namely Calendar, 100, and Quotas, 110, having a 1-n relationship, 130, linking Year, Quarter in each Table.

```
Definition of CALENDAR query subject (table):
  /*It contains the following query items.*/
  MONTHID ( Primary key of the query subject (table) )
  YEAR
  QUARTER
  MONTH
Definition of QUOTAS query subject(table):
  /* It contains the following query items */
  YEAR
  QUARTER
  PRODUCTNUMBER
  SALESSTAFFCODE
  QUOTA    /* this is a measure/quantity */
  CALENDAR (1:1) --- (1:n) QUOTAS on
    (CALENDAR.YEAR = QUOTAS.YEAR and
    CALENDAR.QUARTER = QUOTAS.QUARTER)
/*The data has n--n relationship. Though for
reporting purposes it is modeled as a 1--n
relationship./
It is desired to build a report including columns for:
  Year
  Month
  Quota across all Products for each Year and Month
and including an overall total of the Quota column, i.e. the grand-total
Without using dimensional information the following
code will be generated:
select
  "T0"."C0" "YEAR1",
  "T0"."C1" "MONTH1",
  "T0"."C2" "QUOTA",
  sum("T0"."C2") over() "QUOTA1"
from
(
  select
    "CALENDAR"."YEAR" "C0",
    "CALENDAR"."MONTH" "C1",
    sum("QUOTAS"."QUOTA") "C2"
  from
    "STARQEQC"."CALENDAR" "CALENDAR",
    "STARQEQC"."QUOTAS" "QUOTAS"
  where
    "CALENDAR"."YEAR" = "QUOTAS"."YEAR" and
    "CALENDAR"."QUARTER" = "QUOTAS"."QUARTER"
  group by
    "CALENDAR"."YEAR",
    "CALENDAR"."MONTH"
) "T0"
```

The resultant table is:

| Year | Month | Quota (for quarter) |
|---|---|---|
| 2000 | 01 | 12,140,000 |
| 2000 | 02 | 12,140,000 |
| 2000 | 03 | 12,140,000 |
| 2000 | 04 | 7,500,000 |

-continued

| Year | Month | Quota (for quarter) |
|------|-------|---------------------|
| 2000 | 05 | 7,500,000 |
| 2000 | 06 | 7,500,000 |
| 2000 | 07 | 7,685,000 |
| 2000 | 08 | 7,685,000 |
| 2000 | 09 | 7,685,000 |
| 2000 | 10 | 8,025,000 |
| 2000 | 11 | 8,025,000 |
| 2000 | 12 | 8,025,000 |
|      |       | 106,050,000 |

As can be seen, the above code results in accumulating the entries that are reported at each month, although these entries actually belong to each quarter. The overall total of 106,050,000 is thus inflated 3 times and is useless!

Of course, when dimensional information is supplied manually, the problem of double (or multiple) counting is solved. The following code snippets show one possible solution using a manual method.

This first code snippet defines that YEAR QUARTER 'contains' MONTHID as a lower, or finer, level of granularity. Now when the previous report is run, the query engine has the information that defines the requested item [CALENDAR].[MONTH] as being from a lower level than the items that are used in the relationship between The CALENDAR and QUOTAS query subjects.

```
Dimension Information for CALENDAR query subject
    Hierarchy (H1)
        Level (Year and Quarter):
            Key: [YEAR], [QUARTER]
        Level (Month)
            Key: [MONTHID]
            Property: [MONTH]
```

Using the resultant hierarchy, the following code snippet, which respects the different granularities in the dimension query subject, is generated by the Query Engine:

```
...
select
    coalesce("D2"."YEAR1", "D3"."YEAR1") "YEAR1",
    "D3"."MONTH1" "MONTH1",
    "D2"."QUOTA" "QUOTA",
    min("D2"."QUOTA1") over () "QUOTA1"
from
(
    select distinct
        "CALENDAR"."YEAR" "YEAR1",
        "CALENDAR"."MONTH" "MONTH1"
    from
        "STARQEQC"."CALENDAR" "CALENDAR"
) "D3"
full outer join
(
    select
        "T0"."C0" "YEAR1",
        "T0"."C1" "QUOTA",
        sum("T0"."C1") over () "QUOTA1"
    from
    (
        select
            "CALENDAR"."YEAR1" "C0",
            sum("QUOTAS"."QUOTA") "C1"
        from
        (
            select distinct
                "CALENDAR"."YEAR" "YEAR1",
                "CALENDAR"."QUARTER" "QUARTER"
            from
                "STARQEQC"."CALENDAR" "CALENDAR"
        ) "CALENDAR",
        "STARQEQC"."QUOTAS" "QUOTAS"
        where
            "CALENDAR"."YEAR1" = "QUOTAS"."YEAR"
            and "CALENDAR"."QUARTER" =
            "QUOTAS"."QUARTER"
        group by
            "CALENDAR"."YEAR1"
    ) "T0"
) "D2" on "D3"."YEAR1" = "D2"."YEAR1"
```

The resultant (correct) table is:

| Year | Month | Quota (for quarter) |
|------|-------|---------------------|
| 2000 | 01 | 12,140,000 |
| 2000 | 02 | 12,140,000 |
| 2000 | 03 | 12,140,000 |
| 2000 | 04 | 7,500,000 |
| 2000 | 05 | 7,500,000 |
| 2000 | 06 | 7,500,000 |
| 2000 | 07 | 7,685,000 |
| 2000 | 08 | 7,685,000 |
| 2000 | 09 | 7,685,000 |
| 2000 | 10 | 8,025,000 |
| 2000 | 11 | 8,025,000 |
| 2000 | 12 | 8,025,000 |
|      |       | 35,350,000 |

In the following, a first preferred embodiment of the invention is described that prevents this "double counting" error. This obviates the necessity of the modeler making manual changes. The algorithm of the embodiment computes the dimensional or hierarchical information that was stated previously, based on existing information in the model. In the provided example the following are known:

- the relationship is based on Two query items
- the cardinality of the relationships can be used to determine that the CALENDAR query subject has a lower number of rows than the QUOTAS query subject.
- the relationship is not based on all the key query items of the CALENDAR query subject.

The above would lead to the following dimensional information

```
Hierarchies:
    H_1
        L_1
            Keys:Unique
                K_0->MONTHID
            Props:
                3->MONTH
    H_2
        L_2
            Keys:
                K_1->YEAR
                K_2->QUARTER
        L_1
            Keys:Unique
                K_0->MONTHID
            Props:
                3->MONTH
```

The introduction of a further fact (such as SALES by MONTHID means that the query engine can see two fact query subjects.

Figure 3:
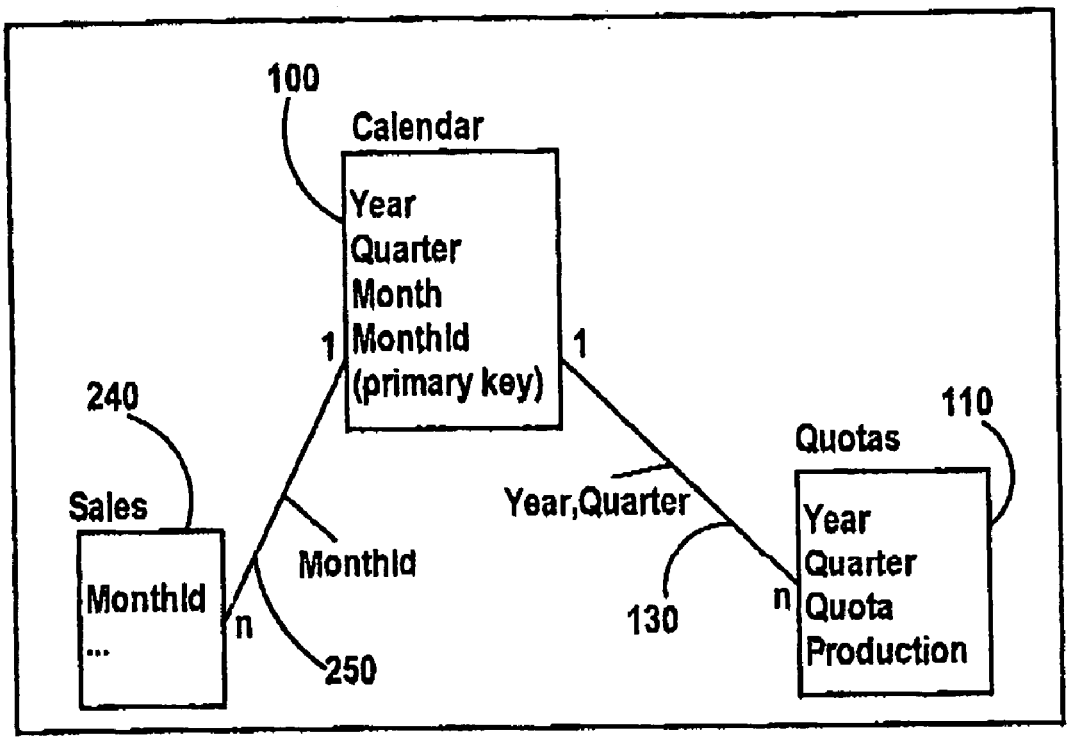
FIG. 3 shows the effect of introducing an embodiment of the invention.

This algorithm leads to a different result when additional information is provided as shown in the entity relationship (ER) diagram of FIG. 3. Here a further fact table or query subject, namely SALES, 240, is introduced, which has a 1 to n relationship, 250, to the CALENDAR fact table, 100. Based on the additional information, more details of the dimensional information of the CALENDAR query subject can be computed.

Based on the additional query subject SALES and its relationship to the CALENDAR query subject, the hierarchical information is computed as:

```
CALENDAR (1:1) --- (1:n) QUOTAS on
      (CALENDAR.YEAR = QUOTAS.YEAR and
      CALENDAR.QUARTER = QUOTAS.QUARTER).
CALENDAR (1:1) --- (1:n) SALES on (MONTHID)
```

The generated dimensional information is the same as for the immediately preceding case.

The query for the report previously defined now becomes:

```
select
    coalesce("D2"."YEAR1", "D3"."YEAR1") "YEAR1",
    "D3"."MONTH1" "MONTH1",
    "D2"."QUOTA" "QUOTA",
    min("D2"."QUOTA1") over () "QUOTA1"
from
(
    select distinct
       "CALENDAR"."YEAR" "YEAR1",
       "CALENDAR"."MONTH" "MONTH1"
    from
       "STARQEQC"."CALENDAR" "CALENDAR"
) "D3"
full outer join
(
    select
       "T0"."C0" "YEAR1",
       "T0"."C1" "QUOTA",
       sum("T0"."C1") over () "QUOTA1"
    from
    (
       select
          "CALENDAR"."YEAR1" "C0",
          sum("QUOTAS"."QUOTA") "C1"
       from
       (
          select distinct
             "CALENDAR"."YEAR" "YEAR1",
             "CALENDAR"."QUARTER" "QUARTER"
          from
             "STARQEQC"."CALENDAR" "CALENDAR"
       ) "CALENDAR",
       "STARQEQC"."QUOTAS" "QUOTAS"
       where
          "CALENDAR"."YEAR1" = "QUOTAS"."YEAR"
          and "CALENDAR"."QUARTER" =
          "QUOTAS"."QUARTER"
          group by "CALENDAR"."YEAR1"
    ) "T0"
) "D2" on "D3"."YEAR1" ="D2"."YEAR1"
```

As in the manually adjusted case, double (Or multiple) counting does not occur.

Figure 4:
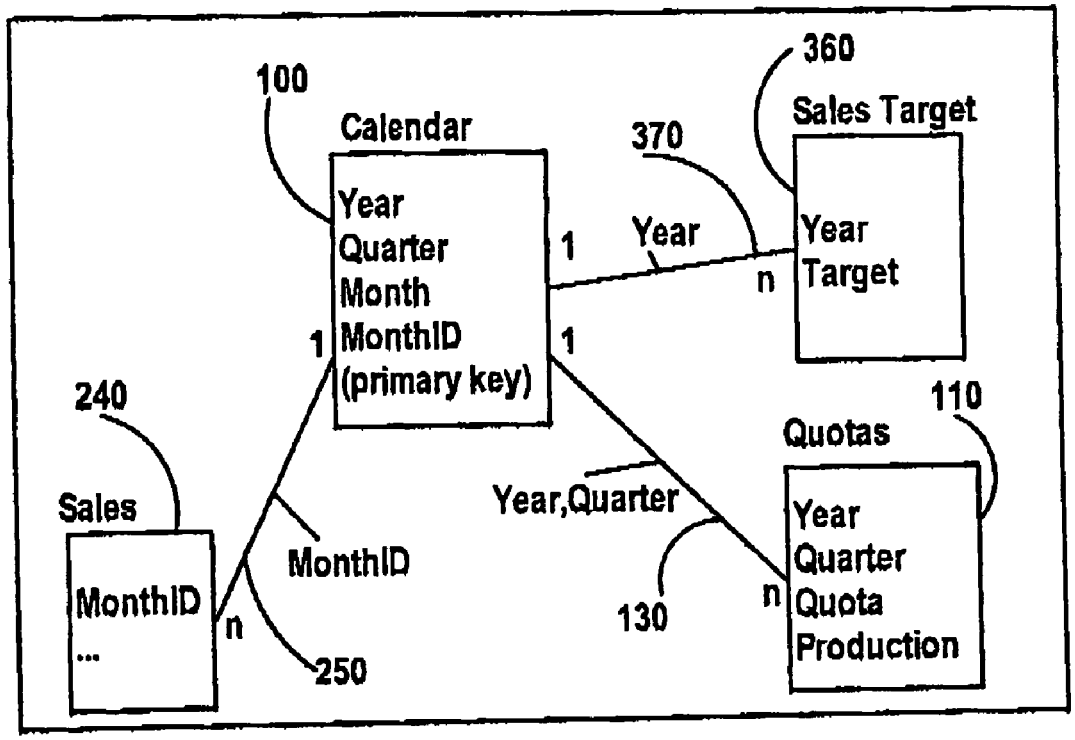
FIG. 4 shows a further example where an embodiment of the invention is introduced.

A further embodiment provides for the situation where CALENDAR does not have dimensional information. In this situation, further information is introduced as shown in the FIG. 4, in which the query subject SALESTARGET, 360, is added. This additional query subject SALESTARGET, 360, is also related, 370, to the query subject CALENDAR, but only through the single query item YEAR.

Here the model is defined as:

```
j1: CALENDAR (1:1) --- (1:n) QUOTAS
      on (CALENDAR.YEAR = QUOTAS.YEAR and
      CALENDAR.QUARTER = QUOTAS.QUARTER).
      /* Note that the real data has N--N
      relationship! */
j2: CALENDAR (1:1) ----(1:n) SALES
      on (CALENDAR.MONTHID = SALES.MONTHID)
j3: CALENDAR (1:1)----(1:n) SALESTARGET
      on (CALENDAR.YEAR = SALESTARGET.YEAR).
      /* The real data has N--N relationship! */
```

The embodiments of the invention first determine:

1. Does the query subject have a primary key (a set of one or more columns that uniquely identify a record) and at least a one-to-many relationship to another query subject, which is not defined on the primary key?

And Then the following step is performed:

2. For each not-on-PrimaryKey one-to-many relationship, fetch and sort the query items used in the relationship.

Embodiments of the invention use this information to determine that [CALENDAR].[YEAR] is at a higher level in the defined hierarchy than [CALEDAR].[QUARTER]. Thus the following dimensional information is computed:

[YEAR] (j3)
[YEAR], [QUARTER] (j1)

The following hierarchy is then generated:
Hierarchies:

```
H_1
    L_1
       Keys:Unique
          K_0->MONTHID
       Props:
          3->MONTH
H_2
    L_3
       Keys:
          K_1->YEAR
    L_2
       Keys:
          K_2->QUARTER
    L_1
       Keys:Unique
          K_0->MONTHID
       Props:
          3->MONTH
```

Other embodiments take advantage of the fact that the dynamically computed information can be used as a first iteration for modeling the dimensional information of a query subject. The modeler can then further refine the computed information, thus allowing generation of more efficient queries.

Figure 5:
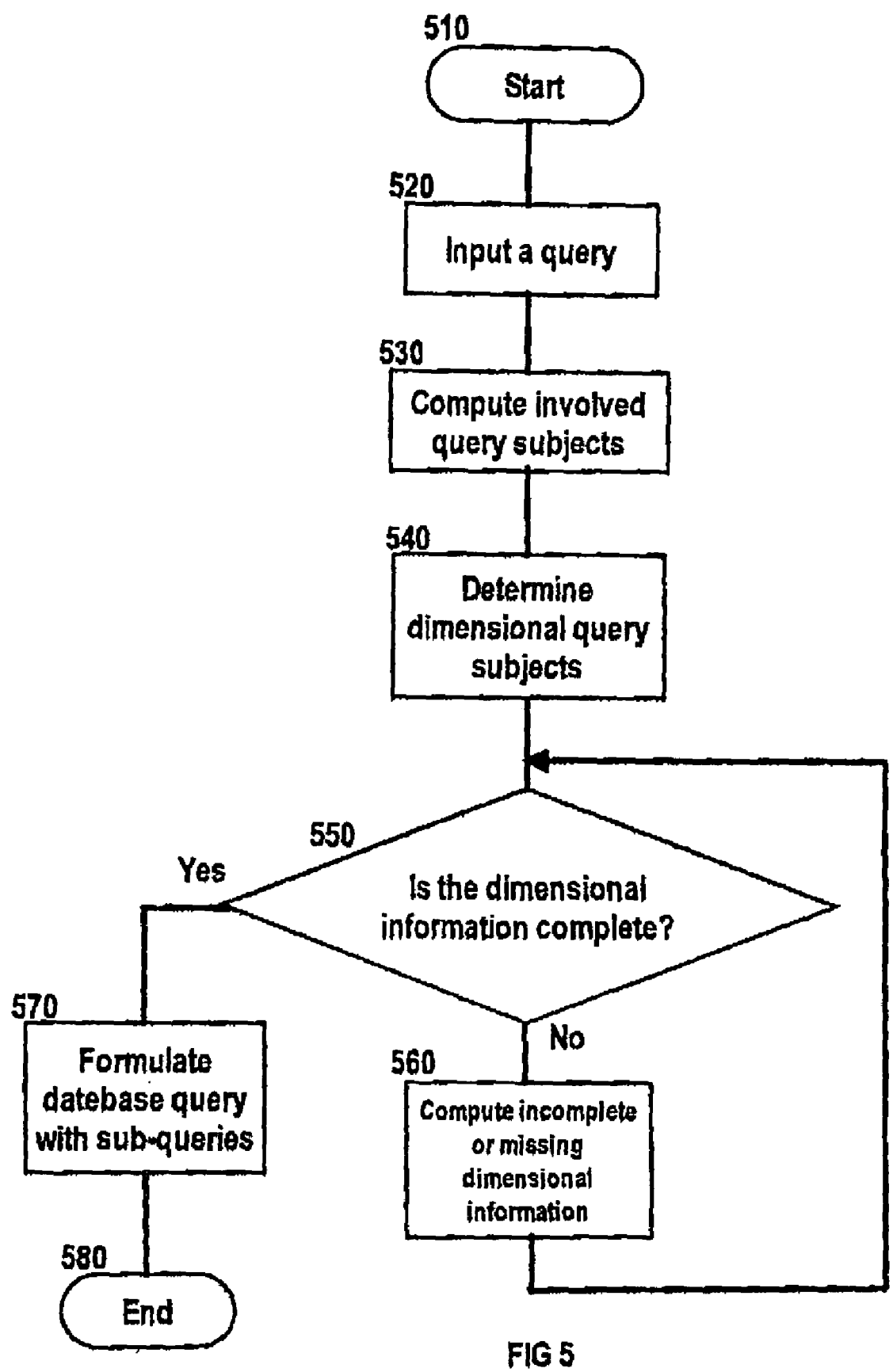
FIG. 5 gives an outline flowchart of an embodiment of the invention.

One embodiment is described with reference to FIG. 5. Any required processing that precedes and follows this process is not described since it is well known and understood. The processing starts 510 by the input of a query 520, and the query subjects defined by the query are computed 520. The related dimensional query subjects are determined 540, and each is assessed to determine whether sufficient dimensional information is available 550. If not the missing information is computed 560 and the query subject again assessed to determine whether sufficient dimensional information is available 550. When there is sufficient dimensional information, the data base query is formulated using subqueries 570, and the process ends.

Embodiments of the present invention may be implemented by any hardware, software or a combination of hardware and software capable of the above-described functions. The entire or a part of the software code may be stored in a computer readable memory for use in a general purpose computer.

What is claim is:

1. A method of creating a report and preventing multiple-counting in a computer-based business intelligence system, using a client application receiving user inputs and a metadata model containing model objects that represent data sources, the method comprising the steps of:
   a) defining a model based on an existing database comprising a plurality of query subjects, each of the plurality of query subject having at least one fact query item and one primary key;
   b) generating a hierarchy of sets and subsets of key query items in the plurality of query subjects within the model according to dimensional information;
   c) accepting an input request from a user to define contents of the report;
   d) determining an expression to extract data from the database to fulfill the input request;
   e) decomposing the expression into subqueries using the hierarchy of sets and subsets of key query items to prevent multiple-counting of data;
   f) accessing the data using the subqueries; and
   g) producing the report;
   wherein the step of generating the hierarchy of sets and subsets of key query items further comprises the steps of;
   i. computing a unique set of determinants for a first query subject where a determinant is related to a first set of key query items;
   ii. detecting a potential for multiple counting by relating a first subset of the first set of key query items of the first query subject to a second query subject;
   iii. relating a second and further subsets of the first subset of the first set of key query items of the first query subject to another query subject where the potential for multiple counting is detected; and
   iv. orgranizing the sets and subsets of key query items into a hierarchy so that the highest level of the hierarchy has fewest key query items and each lower level has more key query items, and each higher level has a set of key query items that is a subset of its immediate lower level, to resolve potential multiple-counting of query items.

2. A system for creating a report and preventing multiple-counting in a computer-based business intelligence system, using a client application receiving user inputs and a metadata model containing model objects that represent the data sources, comprising:
   a) means for defining a model based on an existing database comprising a plurality of query subjects, each of the plurality of query subject having at least one fact query item and one primary key query item;
   b) means for generating a hierarchy of sets and subsets of key query items in the plurality of query subjects within the model according to the dimensional information;
   c) means for accepting an input request from a user to define contents of the report;
   d) means For determining an expression to extract data from the database to fulfill the input request;
   e) means for decomposing the expression into subqueries using the hierarchy of sets and subsets of key query items to prevent multiple counting of data;
   f) means for accessing the data using the subqueries; and
   g) means for producing the report;
   wherein the means for generating the hierarchy of sets and subsets of key query items includes:
   i. means for computing a unique set of determinants for a first query subject where a determinant is related to a first set of key query items;
   ii. means for detecting a potential for multiple counting by relating a first subset of the first set of key query items of the first query subject to the second query subject;
   iii. means for relating a second and further subsets of the first subset of the first set of key query items of the first query subject to another query subject; and
   iv. means for organizing the sets and subsets of key query items into a hierarchy wherein the highest level of the hierarchy has fewest key query items and each lower level has more key query items, and each higher level has a set of key query items that is a subset of its immediate lower level, to resolve potential multiple counting of query items.

3. A storage medium readable by a computer encoding a computer program for execution by the computer to carry out a method for creating a report and preventing multiple-counting, for use in a computer-based business intelligence system, the computer program comprising:
   a) code means for defining a model based on an existing database comprising a plurality of query subjects, each of the plurality of query subject having at least once fact query item and one primary key query item;
   b) code means for generating a hierarchy of sets and subsets of key query items in the plurality of query subjects within the model the according to dimensional information;
   c) code means for accepting an input request from a user to define contents of the report;
   d) code means for determining an expression to extract data from the database to fulfill the input request;
   e) code means for decomposing the expression into subqueries using the hierarchy of sets and subsets of key query items to prevent multiple counting of data;
   f) code means for accessing the data using the subqueries; and
   g) code means for producing the report;
   wherein the code means for generating further includes:
   i. code means for computing a unique set of determinants far a first query subject where a determinant is related to a first set of query items;
   ii. code means for detecting a potential for multiple counting by relating a first subset of the first set of key query items of the first query subject to a second query subject;
   iii. code means for relating a second and further subsets of the first subset of the first set of key query items of the first query subject to another query subject; and
   iv. code means for organizing the sets and subsets of key query items into a hierarchy wherein the highest level of the hierarchy has fewest key query items and each lower level has more key query items, and each higher level has a set of key query items that is a subset of its immediate lower level, to resolve potential multiple counting of query items.

* * * * *